UNITED STATES PATENT OFFICE.

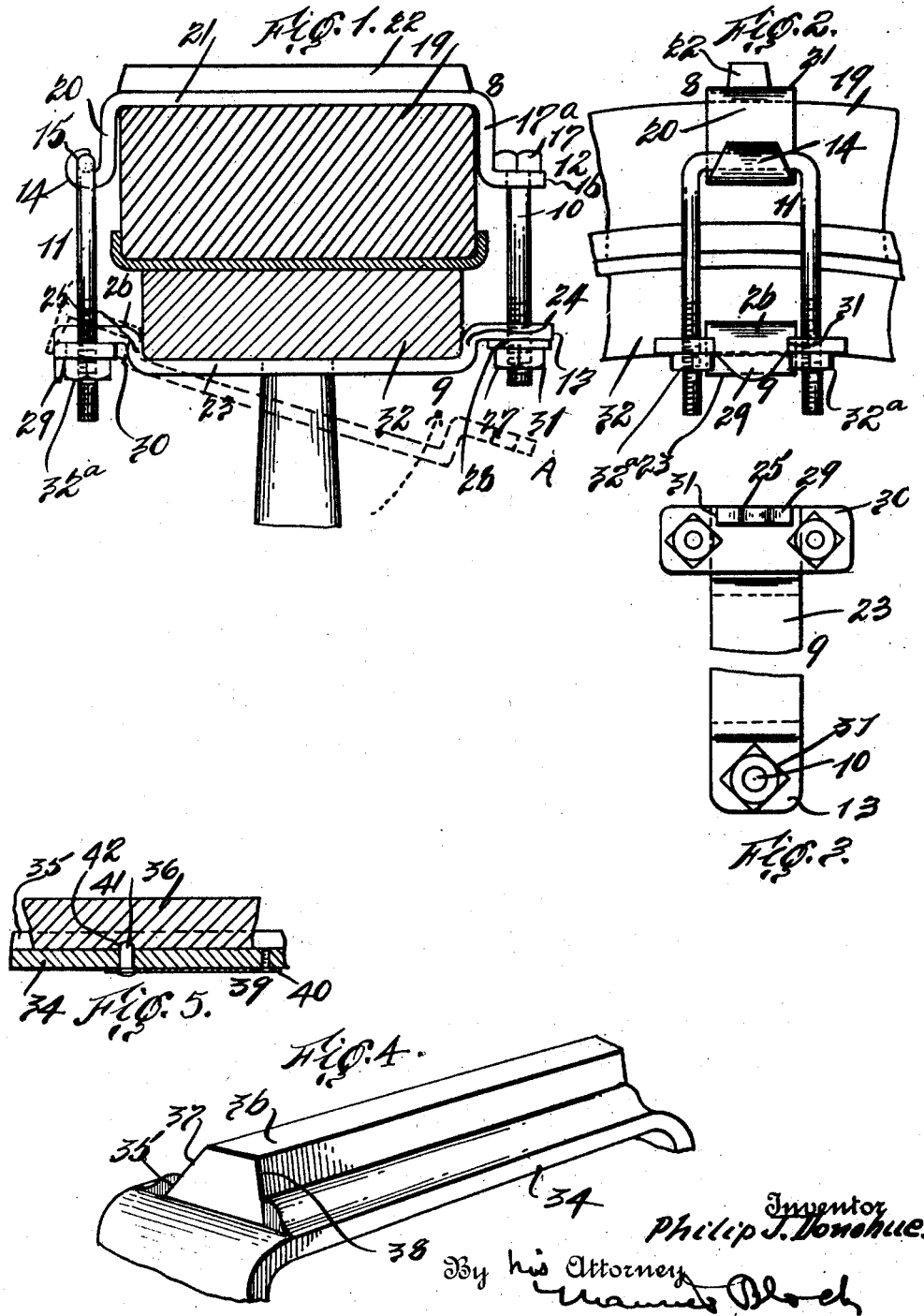

PHILIP J. DONOHUE, OF NEW YORK, N. Y.

GRIPPING ATTACHMENT FOR TIRES.

1,380,137.   Specification of Letters Patent.   Patented May 31, 1921.

Application filed April 16, 1920. Serial No. 374,311.

*To all whom it may concern:*

Be it known that I, PHILIP J. DONOHUE, a citizen of the United States of America, residing at New York city, county and State of New York, have invented certain new and useful Improvements in Gripping Attachments for Tires, of which the following is a full, clear, and exact description.

This invention relates to improvements in gripping devices for vehicle wheels, one of the objects being to provide a device which is applicable to the tires of a motor vehicle (more particularly trucks), that will greatly increase the traction thereof, especially upon slippery roads or when the roads are laden with snow, ice or mud.

My improved gripping device is intended to take the place of cross chains, which are comparatively short lived. The gripping device, which I have designed, may be quickly applied or removed, is non-slippable after having been applied and, as compared to chains, will last for a considerable length of time.

I will now proceed to describe my invention in detail, the novel features of which I will point out in the appended claim, reference being had to the accompanying drawing, wherein:—

Figure 1 is a sectional view of a portion of a wheel having my improvement applied thereto;

Fig. 2 is an end view of my improvement looking from the left in Fig. 1, a portion of a tire and felly of a wheel being illustrated;

Fig. 3 is a bottom plan view of my gripping device broken away;

Fig. 4 is a fragmentary perspective view of a modified form of the gripping element of the device; and Fig. 5 is a fragmentary longitudinal sectional view thereof.

My improved gripping device is in the nature of a clamp that can be applied to a wheel intermediate the spokes, and as many as desirable can be used, one only being illustrated in the drawing. The device consists of a tread member 8 and a felly member 9 connected at one end by a bolt 10 and at the other by a shackle 11. The bolt 10 passes through the ends 12 and 13 of the tread member 8 and felly member 9, respectively, while the shackle 11 is pivotally connected, at its closed end, to the tread member 8. To pivotally connect the shackle and tread member 8, I provide the free end of said tread member 8 with a hook 14 made by turning the said end over upon itself to form an eye 15 through which the closed end of the shackle passes. As can be seen, at the opposite end, the tread member is flanged as at 16 to provide a seat for the head 17 of the bolt 10, which is prevented from turning by the leg $17^a$ of said member.

As can be seen, the tread member is made up of a strip of metal of suitable thickness formed into a channel to fit the tire 19, the leg $17^a$ and leg 20. The leg 20 carries the hook 14, extending from the rail portion 21, and is preferably integral therewith. For gripping purposes, I provide the rail 21 with a fin 22, said fin being preferably integral with the rail. The felly member 9 consists of a strip of metal of suitable thickness and comprises a rail member 23 having extensions 24 and 25 flanged as at 13 and 26. The bolt 10 passes through flange 13, but flange 26 is straddled by the shackle 11 (see Fig. 2). The bolt 10 carries a nut 27, and, if desirable, a lock washer 28. The free end of extension 26 of rail member 23 is bent downwardly as at 29 to form a lip. The flange 26 of rail 23 is engaged by a shackle plate 30, said plate having a recess 31 to receive the lip 29 (see Fig. 3) to prevent movement of the felly member 9 transversely of the shackle 11, after said shackle plate and felly member 9 have been connected. As is evident, the felly member 9 is channeled to fit the felly 32 of the wheel To apply the device the tread member 8 will be placed upon the tire, after which the lip 29 on the felly member 9 will be slipped through the shackle 11 and over plate 30 (see dotted lines Fig. 1). After the said felly member has been applied to the shackle plate and moved upwardly at the end A to cause the bolt 10 to pass through the bolt opening in the end 13 of said felly member, the nut 31 can be applied and screwed home. After the felly member 9 has been applied, nuts $32^a$ of the shackle and nut 31 can be screwed home. The shackle 11 and bolt 10 will be long enough to provide for considerable adjustment upon the part of the felly member 9. Hence the device can be applied to tires and fellies of different thickness. When applied to a tire, the shackle will be preferably positioned at the inside of the wheel, as the device can be more easily applied when positioned as stated.

For ordinary use the fin 22 will grip the road and increase traction and will outlast a chain. Instead of forming the fin 22 integral with the rail 21, I may construct the tread portion, as indicated in Fig. 6, with a rail portion 34 having a rabbet groove 35 to receive a fin 36 having angular sides 37 and 38. In this form of my invention one fin 36 can be removed and another substituted. To maintain the fin 36 in position, I provide a latch mechanism, indicated by 39, consisting of a yieldable plate 40 carrying a pin 41 to engage a recess 42 in the bottom of the fin 36. The pin 41 passes through an opening 43 in the rail 34. To remove the fin 36, plate 40 will be sprung downwardly to withdraw pin 41 from the recess 42, after which fin 36 can be driven out of the rabbet groove 35. To insert a fin into said groove, the operation will be reversed, that is to say, the pin 41 will be depressed and after the new fin has been driven in, pin 41 will spring into recess 42. As the plate 40 will always lie next to the tire, it cannot be prematurely operated to draw pin 41 out of recess 42 during the operation of the vehicle.

One of the advantages of my device is that the felly member becomes a lever to draw the tread member against a tire as soon as the lip is caused to engage the shackle plate and the felly member forced upwardly at its free end to be engaged by the bolt 10.

What I claim and desire to secure by Letters Patent is:—

In a tire gripping device, a tread member consisting of a rail to extend transversely of a tire, said rail being provided with a groove extending longitudinally, a fin removably located in said groove, a releasable latch carried by the rail to engage said fin, and means to secure said tread member to a wheel.

Signed at New York city, N. Y., this 14 day of April, 1920.

PHILIP J. DONOHUE.

Witnesses:
EDUARD A. JARVIS,
WILLIAM BLOCH.